(12) United States Patent
Novotney et al.

(10) Patent No.: US 8,590,036 B2
(45) Date of Patent: *Nov. 19, 2013

(54) METHOD AND SYSTEM FOR AUTHENTICATING AN ACCESSORY

(75) Inventors: Donald J. Novotney, San Jose, CA (US); John B. Filson, San Jose, CA (US); David Tupman, San Francisco, CA (US); Gregory T. Lydon, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/347,511

(22) Filed: Jan. 10, 2012

(65) Prior Publication Data

US 2013/0014247 A1  Jan. 10, 2013

Related U.S. Application Data

(63) Continuation of application No. 11/476,999, filed on Jun. 27, 2006, now Pat. No. 8,117,651.

(51) Int. Cl.
*G06F 13/00* (2006.01)

(52) U.S. Cl.
USPC .......................................................... 726/16

(58) Field of Classification Search
None
See application file for complete search history.

(56) References Cited

U.S. PATENT DOCUMENTS

| | | | |
|---|---|---|---|
| 4,673,861 A | 6/1987 | Dubovsky et al. | |
| 4,850,899 A | 7/1989 | Maynard | |
| 4,916,334 A | 4/1990 | Minagawa et al. | |
| 4,924,216 A | 5/1990 | Leung | |
| 4,938,483 A | 7/1990 | Yavetz | |
| 5,041,025 A | 8/1991 | Haitmanek | |
| 5,051,606 A | 9/1991 | Ikehara | |
| 5,055,069 A | 10/1991 | Townsend et al. | |
| 5,080,603 A | 1/1992 | Mouissie | |
| 5,104,243 A | 4/1992 | Harding | |
| 5,108,313 A | 4/1992 | Adams | |
| 5,150,031 A | 9/1992 | James et al. | |
| 5,186,646 A | 2/1993 | Pederson | |
| 5,247,138 A | 9/1993 | Landmeier | |
| 5,277,624 A | 1/1994 | Champion | |
| 5,471,128 A | 11/1995 | Patino et al. | |

(Continued)

FOREIGN PATENT DOCUMENTS

| CN | 1759367 A | 4/2006 |
|---|---|---|
| EP | 1104150 A2 | 5/2001 |

(Continued)

OTHER PUBLICATIONS

Non-Final Office Action mailed Oct. 26, 2012; U.S. Appl. No. 13/474,552, filed May 17, 2012 (27 pages).

(Continued)

*Primary Examiner* — Brandon Hoffman
(74) *Attorney, Agent, or Firm* — Kilpatrick Townsend & Stockton LLP

(57) ABSTRACT

A method, system, and connector interface for authenticating an accessory, the method includes performing a first authentication operation on the accessory by the media player, where an authentication certificate is validated; and performing a second authentication operation on the accessory by the media player, where an authentication signature is validated. According to the system and method disclosed herein, the media player and accessory may utilize a plurality of commands utilized in a variety of environments such as within a connector interface system environment to control access to the media player.

25 Claims, 12 Drawing Sheets

(56) References Cited

U.S. PATENT DOCUMENTS

| | | |
|---|---|---|
| 5,525,981 A | 6/1996 | Abernethy |
| 5,546,397 A | 8/1996 | Mahany |
| 5,586,893 A | 12/1996 | Mosquera |
| 5,592,588 A | 1/1997 | Reekes et al. |
| 5,618,045 A | 4/1997 | Kagan et al. |
| 5,648,712 A | 7/1997 | Hahn |
| 5,660,558 A | 8/1997 | Osanai et al. |
| 5,675,467 A | 10/1997 | Nishimura et al. |
| 5,727,866 A | 3/1998 | Kraines et al. |
| 5,732,361 A | 3/1998 | Liu |
| 5,754,027 A | 5/1998 | Oglesbee et al. |
| 5,830,001 A | 11/1998 | Kinoshita |
| 5,835,862 A | 11/1998 | Nykanen et al. |
| 5,845,217 A | 12/1998 | Lindell et al. |
| 5,859,522 A | 1/1999 | Theobald |
| 5,884,323 A | 3/1999 | Hawkins et al. |
| 5,901,049 A | 5/1999 | Schmidt et al. |
| 5,949,877 A | 9/1999 | Traw et al. |
| 5,964,847 A | 10/1999 | Booth, III et al. |
| 5,975,957 A | 11/1999 | Noda et al. |
| 5,991,640 A | 11/1999 | Lilja et al. |
| 6,007,372 A | 12/1999 | Wood |
| 6,012,105 A | 1/2000 | Rubbmark et al. |
| 6,031,797 A | 2/2000 | Van Ryzin et al. |
| 6,053,773 A | 4/2000 | Wu |
| 6,078,402 A | 6/2000 | Fischer et al. |
| 6,078,789 A | 6/2000 | Bodenmann et al. |
| 6,125,455 A | 9/2000 | Yeo |
| 6,130,518 A | 10/2000 | Gabehart et al. |
| 6,139,373 A | 10/2000 | Ward et al. |
| 6,154,773 A | 11/2000 | Roberts et al. |
| 6,154,798 A | 11/2000 | Lin et al. |
| 6,161,027 A | 12/2000 | Poirel |
| 6,169,387 B1 | 1/2001 | Kaib |
| 6,175,358 B1 | 1/2001 | Scott-Jackson et al. |
| 6,178,514 B1 | 1/2001 | Wood |
| 6,184,652 B1 | 2/2001 | Yang |
| 6,184,655 B1 | 2/2001 | Malackowski |
| 6,188,265 B1 | 2/2001 | Liu et al. |
| 6,192,340 B1 | 2/2001 | Abecassis |
| 6,203,345 B1 | 3/2001 | Roque et al. |
| 6,204,637 B1 | 3/2001 | Rengan |
| 6,206,480 B1 | 3/2001 | Thompson |
| 6,211,581 B1 | 4/2001 | Farrant |
| 6,211,649 B1 | 4/2001 | Matsuda |
| 6,224,420 B1 | 5/2001 | Nishio et al. |
| 6,230,205 B1 | 5/2001 | Garrity et al. |
| 6,230,322 B1 | 5/2001 | Saib et al. |
| 6,234,827 B1 | 5/2001 | Nishio et al. |
| 6,236,395 B1 | 5/2001 | Sezan et al. |
| 6,247,135 B1 | 6/2001 | Feague |
| 6,252,380 B1 | 6/2001 | Koenck |
| 6,255,961 B1 | 7/2001 | Van Ryzin et al. |
| 6,261,109 B1 | 7/2001 | Liu et al. |
| 6,262,723 B1 | 7/2001 | Matsuzawa et al. |
| 6,267,623 B1 | 7/2001 | Hisamatsu |
| 6,268,845 B1 | 7/2001 | Pariza et al. |
| 6,271,605 B1 | 8/2001 | Carkner et al. |
| 6,272,328 B1 | 8/2001 | Nguyen et al. |
| 6,280,251 B1 | 8/2001 | Nishio et al. |
| 6,283,789 B1 | 9/2001 | Tsai |
| 6,304,764 B1 | 10/2001 | Pan |
| 6,314,326 B1 | 11/2001 | Fuchu |
| 6,314,479 B1 | 11/2001 | Frederick et al. |
| 6,316,916 B2 | 11/2001 | Bohne |
| 6,319,061 B1 | 11/2001 | Chen et al. |
| 6,322,396 B1 | 11/2001 | Kuan |
| 6,336,365 B1 | 1/2002 | Blackadar et al. |
| 6,344,727 B1 | 2/2002 | Desai et al. |
| 6,353,894 B1 | 3/2002 | Pione |
| 6,354,713 B1 | 3/2002 | Leifer et al. |
| 6,358,089 B1 | 3/2002 | Kuroda et al. |
| 6,372,974 B1 | 4/2002 | Gross et al. |
| 6,377,825 B1 | 4/2002 | Kennedy et al. |
| 6,385,596 B1 | 5/2002 | Wiser et al. |
| 6,394,905 B1 | 5/2002 | Takeda et al. |
| 6,418,421 B1 | 7/2002 | Hurtado et al. |
| 6,429,622 B1 | 8/2002 | Svensson |
| 6,429,879 B1 | 8/2002 | Sturgeon et al. |
| 6,431,915 B1 | 8/2002 | Ko |
| 6,453,371 B1 | 9/2002 | Hampson et al. |
| 6,454,592 B2 | 9/2002 | Takagi |
| 6,461,173 B1 | 10/2002 | Mizuno et al. |
| 6,464,542 B1 | 10/2002 | Lee |
| 6,468,110 B2 | 10/2002 | Fujino et al. |
| 6,476,825 B1 | 11/2002 | Croy et al. |
| 6,478,603 B1 | 11/2002 | Wu |
| 6,483,428 B1 | 11/2002 | Fish et al. |
| 6,485,328 B1 | 11/2002 | Wu |
| 6,489,751 B2 | 12/2002 | Small et al. |
| 6,490,667 B1 | 12/2002 | Ikeda |
| 6,501,441 B1 | 12/2002 | Ludtke et al. |
| 6,505,160 B1 | 1/2003 | Levy et al. |
| 6,524,119 B2 | 2/2003 | Kato et al. |
| 6,526,287 B1 | 2/2003 | Lee |
| 6,535,981 B1 | 3/2003 | Shimizu |
| 6,535,983 B1 | 3/2003 | McCormack et al. |
| 6,558,201 B1 | 5/2003 | Begley et al. |
| 6,559,773 B1 | 5/2003 | Berry |
| 6,577,877 B1 | 6/2003 | Charlier et al. |
| 6,589,076 B1 | 7/2003 | Davis et al. |
| 6,591,085 B1 | 7/2003 | Grady |
| 6,606,707 B1 | 8/2003 | Hirota et al. |
| 6,608,264 B1 | 8/2003 | Fouladpour |
| 6,608,399 B2 | 8/2003 | McConnell et al. |
| 6,614,232 B1 | 9/2003 | Mukai |
| 6,616,473 B2 | 9/2003 | Kamata et al. |
| 6,629,197 B1 | 9/2003 | Bhogal et al. |
| 6,642,629 B2 | 11/2003 | DeLeeuw |
| 6,643,777 B1 | 11/2003 | Chu |
| 6,650,549 B1 | 11/2003 | Chiao |
| 6,651,138 B2 | 11/2003 | Lai et al. |
| 6,653,813 B2 | 11/2003 | Khatri |
| 6,663,420 B1 | 12/2003 | Xiao |
| 6,665,803 B2 | 12/2003 | Lunsford et al. |
| 6,670,997 B1 | 12/2003 | Nortrup |
| 6,674,995 B1 | 1/2004 | Meyers et al. |
| 6,687,454 B1 | 2/2004 | Kuroiwa |
| 6,697,944 B1 | 2/2004 | Jones et al. |
| 6,708,283 B1 | 3/2004 | Nelvin et al. |
| 6,724,339 B2 | 4/2004 | Conway et al. |
| 6,725,061 B1 | 4/2004 | Hutchison, IV et al. |
| 6,728,546 B1 | 4/2004 | Peterson et al. |
| 6,728,729 B1 | 4/2004 | Jawa et al. |
| 6,747,859 B2 | 6/2004 | Walbeck et al. |
| 6,754,468 B1 | 6/2004 | Sieben et al. |
| 6,761,635 B2 | 7/2004 | Hoshino et al. |
| 6,774,939 B1 | 8/2004 | Peng |
| 6,776,626 B2 | 8/2004 | Huang et al. |
| 6,776,660 B1 | 8/2004 | Kubota et al. |
| 6,776,665 B2 | 8/2004 | Huang |
| 6,799,226 B1 | 9/2004 | Robbin et al. |
| 6,801,964 B1 | 10/2004 | Mahdavi |
| 6,813,528 B1 | 11/2004 | Yang |
| 6,816,376 B2 | 11/2004 | Bright et al. |
| 6,830,160 B2 | 12/2004 | Risolia |
| 6,859,538 B2 | 2/2005 | Voltz |
| 6,859,854 B2 | 2/2005 | Kwong |
| 6,870,733 B2 | 3/2005 | Castell et al. |
| 6,879,843 B1 | 4/2005 | Kim |
| 6,928,295 B2 | 8/2005 | Olson et al. |
| 6,931,266 B2 | 8/2005 | Miyoshi et al. |
| 6,931,456 B2 | 8/2005 | Payne et al. |
| 6,939,177 B2 | 9/2005 | Kato et al. |
| 6,944,704 B2 | 9/2005 | Brelin |
| 6,991,483 B1 | 1/2006 | Milan et al. |
| 7,004,787 B2 | 2/2006 | Milan |
| 7,006,793 B2 | 2/2006 | Himmel et al. |
| 7,013,164 B2 | 3/2006 | Lin |
| 7,040,919 B2 | 5/2006 | Yao |
| 7,046,230 B2 | 5/2006 | Zadesky |
| 7,050,783 B2 | 5/2006 | Curtiss et al. |
| 7,054,888 B2 | 5/2006 | LaChapelle et al. |
| 7,062,261 B2 | 6/2006 | Goldstein et al. |

(56) References Cited

U.S. PATENT DOCUMENTS

| | | |
|---|---|---|
| 7,108,560 B1 | 9/2006 | Chou et al. |
| 7,120,462 B2 | 10/2006 | Kumar |
| 7,127,678 B2 | 10/2006 | Bhesania et al. |
| 7,127,879 B2 | 10/2006 | Zhu et al. |
| 7,149,543 B2 | 12/2006 | Kumar |
| 7,155,545 B1 | 12/2006 | Wang |
| 7,167,112 B2 | 1/2007 | Andersen et al. |
| 7,167,935 B2 | 1/2007 | Hellberg |
| 7,187,947 B1 | 3/2007 | White et al. |
| 7,187,948 B2 | 3/2007 | Alden |
| 7,215,042 B2 | 5/2007 | Yan |
| 7,281,214 B2 | 10/2007 | Fadell |
| 7,293,122 B1 | 11/2007 | Schubert et al. |
| 7,293,227 B2 | 11/2007 | Plastina et al. |
| 7,299,304 B2 | 11/2007 | Saint-Hilaire et al. |
| 7,303,282 B2 | 12/2007 | Dwyer et al. |
| 7,304,685 B2 | 12/2007 | Park et al. |
| 7,305,254 B2 | 12/2007 | Findikli |
| 7,305,506 B1 | 12/2007 | Lydon et al. |
| 7,322,043 B2 | 1/2008 | Letsinger |
| 7,324,833 B2 | 1/2008 | White et al. |
| 7,362,963 B2 | 4/2008 | Lin |
| 7,363,129 B1 | 4/2008 | Barnicle et al. |
| 7,391,963 B2 | 6/2008 | Chen et al. |
| 7,415,563 B1 | 8/2008 | Holden et al. |
| 7,441,058 B1 | 10/2008 | Bolton et al. |
| 7,441,062 B2 | 10/2008 | Novotney et al. |
| 7,444,388 B1 | 10/2008 | Svendsen |
| 7,450,961 B1 | 11/2008 | Heubel et al. |
| 7,454,019 B2 | 11/2008 | Williams |
| 7,493,645 B1 | 2/2009 | Tranchina |
| 7,526,588 B1 | 4/2009 | Schubert et al. |
| 7,529,870 B1 | 5/2009 | Schubert et al. |
| 7,529,871 B1 | 5/2009 | Schubert et al. |
| 7,529,872 B1 | 5/2009 | Schubert et al. |
| 7,558,894 B1 | 7/2009 | Lydon et al. |
| 7,587,540 B2 | 9/2009 | Novotney et al. |
| 7,590,783 B2 | 9/2009 | Lydon et al. |
| 7,610,350 B2 | 10/2009 | Abdulrahiman et al. |
| 7,634,605 B2 | 12/2009 | Laefer et al. |
| 7,660,929 B2 | 2/2010 | Novotney et al. |
| 7,670,263 B2 | 3/2010 | Ellis et al. |
| 7,673,020 B2 | 3/2010 | Rosenbloom et al. |
| 7,673,083 B2 | 3/2010 | Laefer et al. |
| 7,680,849 B2 | 3/2010 | Heller et al. |
| 7,681,033 B2 | 3/2010 | Miura et al. |
| 7,702,833 B2 | 4/2010 | Novotney et al. |
| 7,757,026 B2 | 7/2010 | Novotney et al. |
| 7,779,185 B2 | 8/2010 | Schubert et al. |
| 7,791,319 B2 | 9/2010 | Veselic et al. |
| 7,797,471 B2 | 9/2010 | Laefer et al. |
| 7,823,214 B2 | 10/2010 | Rubinstein et al. |
| 7,836,493 B2 | 11/2010 | Xia et al. |
| 7,853,746 B2 | 12/2010 | Novotney et al. |
| 7,877,532 B2 | 1/2011 | Schubert et al. |
| 8,073,426 B2 | 12/2011 | Ishikawa |
| 8,117,651 B2 | 2/2012 | Novotney et al. |
| 8,161,567 B2 | 4/2012 | Rubinstein et al. |
| 8,208,853 B2 | 6/2012 | Lydon et al. |
| 8,238,811 B2 | 8/2012 | Lydon |
| 2001/0003205 A1 | 6/2001 | Gilbert |
| 2001/0005641 A1 | 6/2001 | Matsumoto et al. |
| 2001/0006884 A1 | 7/2001 | Matsumoto |
| 2001/0042107 A1 | 11/2001 | Palm |
| 2002/0002035 A1 | 1/2002 | Sim et al. |
| 2002/0010759 A1 | 1/2002 | Hitson et al. |
| 2002/0015362 A1 | 2/2002 | Cowgill et al. |
| 2002/0025042 A1 | 2/2002 | Saito |
| 2002/0029303 A1 | 3/2002 | Nguyen |
| 2002/0065074 A1 | 5/2002 | Cohn et al. |
| 2002/0068610 A1 | 6/2002 | Anvekar et al. |
| 2002/0072390 A1 | 6/2002 | Uchiyama |
| 2002/0103008 A1 | 8/2002 | Rahn et al. |
| 2002/0105861 A1 | 8/2002 | Leapman |
| 2002/0108108 A1 | 8/2002 | Akaiwa et al. |
| 2002/0115480 A1 | 8/2002 | Huang |
| 2002/0116533 A1 | 8/2002 | Holliman et al. |
| 2002/0120850 A1 | 8/2002 | Walker et al. |
| 2002/0132651 A1 | 9/2002 | Jinnouchi |
| 2002/0151327 A1 | 10/2002 | Levitt |
| 2002/0152874 A1 | 10/2002 | Vilcauskas et al. |
| 2002/0156546 A1 | 10/2002 | Ramaswamy |
| 2002/0156949 A1 | 10/2002 | Kubo et al. |
| 2002/0161865 A1 | 10/2002 | Nguyen |
| 2002/0173273 A1 | 11/2002 | Spurgat et al. |
| 2002/0174269 A1 | 11/2002 | Spurgat et al. |
| 2002/0191764 A1 | 12/2002 | Hori et al. |
| 2002/0194621 A1 | 12/2002 | Tran et al. |
| 2003/0004934 A1 | 1/2003 | Qian |
| 2003/0011608 A1 | 1/2003 | Wada |
| 2003/0028664 A1 | 2/2003 | Tan et al. |
| 2003/0041206 A1 | 2/2003 | Dickie |
| 2003/0059022 A1 | 3/2003 | Nebiker et al. |
| 2003/0067741 A1 | 4/2003 | Alfonso et al. |
| 2003/0073432 A1 | 4/2003 | Meade |
| 2003/0079038 A1 | 4/2003 | Robbin et al. |
| 2003/0090988 A1 | 5/2003 | Sun et al. |
| 2003/0097379 A1 | 5/2003 | Ireton |
| 2003/0110403 A1 | 6/2003 | Crutchfield et al. |
| 2003/0151621 A1 | 8/2003 | McEvilly et al. |
| 2003/0167318 A1 | 9/2003 | Robbin et al. |
| 2003/0172209 A1 | 9/2003 | Liu et al. |
| 2003/0185395 A1 | 10/2003 | Lee et al. |
| 2003/0198015 A1 | 10/2003 | Vogt |
| 2003/0212895 A1 | 11/2003 | Kisliakov |
| 2003/0215102 A1 | 11/2003 | Marlowe |
| 2003/0220988 A1 | 11/2003 | Hymel |
| 2003/0236075 A1 | 12/2003 | Johnson et al. |
| 2003/0236991 A1 | 12/2003 | Letsinger |
| 2003/0237043 A1 | 12/2003 | Novak et al. |
| 2004/0003300 A1 | 1/2004 | Malueg et al. |
| 2004/0006713 A1 | 1/2004 | Minemura |
| 2004/0019497 A1 | 1/2004 | Volk et al. |
| 2004/0039860 A1 | 2/2004 | Mills et al. |
| 2004/0048569 A1 | 3/2004 | Kawamura |
| 2004/0055446 A1 | 3/2004 | Robbin et al. |
| 2004/0090998 A1 | 5/2004 | Chen |
| 2004/0103223 A1 | 5/2004 | Gabehart et al. |
| 2004/0116005 A1 | 6/2004 | Choi |
| 2004/0151327 A1 | 8/2004 | Marlow |
| 2004/0152439 A1 | 8/2004 | Kimura et al. |
| 2004/0162029 A1 | 8/2004 | Grady |
| 2004/0164708 A1 | 8/2004 | Veselic et al. |
| 2004/0172533 A1 | 9/2004 | DeMello et al. |
| 2004/0186935 A1 | 9/2004 | Bel et al. |
| 2004/0194154 A1 | 9/2004 | Meadors et al. |
| 2004/0198436 A1 | 10/2004 | Alden |
| 2004/0224638 A1 | 11/2004 | Fadell et al. |
| 2004/0235339 A1 | 11/2004 | Sato et al. |
| 2004/0242029 A1 | 12/2004 | Nakamura et al. |
| 2004/0249994 A1 | 12/2004 | Shapiro et al. |
| 2004/0252966 A1 | 12/2004 | Holloway et al. |
| 2004/0267812 A1 | 12/2004 | Harris et al. |
| 2004/0267825 A1 | 12/2004 | Novak et al. |
| 2004/0268397 A1 | 12/2004 | Dunbar et al. |
| 2005/0001589 A1 | 1/2005 | Edington |
| 2005/0005133 A1 | 1/2005 | Xia et al. |
| 2005/0014119 A1 | 1/2005 | Rudakov |
| 2005/0014531 A1 | 1/2005 | Findikli |
| 2005/0014536 A1 | 1/2005 | Grady |
| 2005/0015355 A1 | 1/2005 | Heller et al. |
| 2005/0017946 A1 | 1/2005 | Park |
| 2005/0018768 A1 | 1/2005 | Mabey et al. |
| 2005/0022212 A1 | 1/2005 | Bowen |
| 2005/0047071 A1 | 3/2005 | Tse Chun Hin |
| 2005/0075136 A1 | 4/2005 | Cromer et al. |
| 2005/0080915 A1 | 4/2005 | Shoemaker et al. |
| 2005/0111675 A1 | 5/2005 | Lee |
| 2005/0135790 A1 | 6/2005 | Hutten |
| 2005/0138433 A1 | 6/2005 | Linetsky |
| 2005/0149213 A1 | 7/2005 | Guzak et al. |
| 2005/0149551 A1 | 7/2005 | Fong et al. |
| 2005/0159149 A1 | 7/2005 | Wen et al. |
| 2005/0181756 A1 | 8/2005 | Lin |

(56) References Cited

U.S. PATENT DOCUMENTS

| | | |
|---|---|---|
| 2005/0198189 A1 | 9/2005 | Robinson et al. |
| 2005/0207726 A1 | 9/2005 | Chen |
| 2005/0227612 A1 | 10/2005 | Helstrom et al. |
| 2005/0239333 A1 | 10/2005 | Watanabe et al. |
| 2005/0240705 A1 | 10/2005 | Novotney et al. |
| 2005/0246375 A1 | 11/2005 | Manders et al. |
| 2005/0251565 A1 | 11/2005 | Weel |
| 2005/0281185 A1 | 12/2005 | Kawasaki |
| 2006/0015826 A1 | 1/2006 | Shiozawa et al. |
| 2006/0031545 A1 | 2/2006 | Manders et al. |
| 2006/0056796 A1 | 3/2006 | Nishizawa et al. |
| 2006/0072527 A1 | 4/2006 | Beck |
| 2006/0075098 A1 | 4/2006 | Becker et al. |
| 2006/0088228 A1 | 4/2006 | Marriott et al. |
| 2006/0116009 A1 | 6/2006 | Langberg et al. |
| 2006/0126422 A1 | 6/2006 | Takagi et al. |
| 2006/0143680 A1 | 6/2006 | Adachi |
| 2006/0150123 A1 | 7/2006 | Goodwin et al. |
| 2006/0156415 A1 | 7/2006 | Rubinstein et al. |
| 2006/0161621 A1 | 7/2006 | Rosenberg |
| 2006/0163358 A1 | 7/2006 | Biderman |
| 2006/0168298 A1 | 7/2006 | Aoki et al. |
| 2006/0184456 A1 | 8/2006 | de Janasz |
| 2006/0188237 A1 | 8/2006 | Watanabe et al. |
| 2006/0205349 A1 | 9/2006 | Passier et al. |
| 2006/0224620 A1 | 10/2006 | Silverman et al. |
| 2006/0236245 A1 | 10/2006 | Agarwal et al. |
| 2006/0247851 A1 | 11/2006 | Morris |
| 2006/0258289 A1 | 11/2006 | Dua |
| 2006/0277555 A1 | 12/2006 | Howard |
| 2006/0294209 A1 | 12/2006 | Rosenbloom et al. |
| 2007/0011138 A1 | 1/2007 | Boucard |
| 2007/0018947 A1 | 1/2007 | Toro-Lira |
| 2007/0056012 A1 | 3/2007 | Kwon et al. |
| 2007/0056013 A1 | 3/2007 | Duncan |
| 2007/0070856 A1 | 3/2007 | Tebele |
| 2007/0077784 A1 | 4/2007 | Kalayjian et al. |
| 2007/0080823 A1 | 4/2007 | Fu et al. |
| 2007/0083750 A1 | 4/2007 | Miura et al. |
| 2007/0083814 A1 | 4/2007 | Wilbrink et al. |
| 2007/0086724 A1 | 4/2007 | Grady et al. |
| 2007/0106760 A1 | 5/2007 | Houh et al. |
| 2007/0130592 A1 | 6/2007 | Haeusel |
| 2007/0173197 A1 | 7/2007 | Hsiung |
| 2007/0173294 A1 | 7/2007 | Hsiung |
| 2007/0206827 A1 | 9/2007 | Tupman et al. |
| 2007/0209081 A1 | 9/2007 | Morris |
| 2007/0226238 A1 | 9/2007 | Kiilerich et al. |
| 2007/0226384 A1 | 9/2007 | Robbin et al. |
| 2007/0230910 A1 | 10/2007 | Welch et al. |
| 2007/0233294 A1 | 10/2007 | Holden et al. |
| 2007/0233295 A1 | 10/2007 | Laefer et al. |
| 2007/0234420 A1 | 10/2007 | Novotney et al. |
| 2007/0236482 A1 | 10/2007 | Proctor et al. |
| 2007/0244984 A1 | 10/2007 | Svendsen |
| 2007/0247794 A1 | 10/2007 | Jaffe et al. |
| 2007/0271387 A1 | 11/2007 | Lydon et al. |
| 2007/0280489 A1 | 12/2007 | Roman et al. |
| 2007/0291404 A1 | 12/2007 | Morse et al. |
| 2007/0300155 A1 | 12/2007 | Laefer et al. |
| 2008/0010014 A1 | 1/2008 | Hess et al. |
| 2008/0025172 A1 | 1/2008 | Holden et al. |
| 2008/0034325 A1 | 2/2008 | Ording |
| 2008/0055272 A1 | 3/2008 | Anzures et al. |
| 2008/0065722 A1 | 3/2008 | Brodersen et al. |
| 2008/0155129 A1 | 6/2008 | Khedouri et al. |
| 2008/0188209 A1 | 8/2008 | Dorogusker et al. |
| 2009/0013096 A1 | 1/2009 | Novotney et al. |
| 2009/0013110 A1 | 1/2009 | Novotney et al. |
| 2009/0013253 A1 | 1/2009 | Laefer et al. |
| 2009/0083834 A1 | 3/2009 | Rubinstein et al. |
| 2009/0125134 A1 | 5/2009 | Bolton et al. |
| 2009/0132076 A1 | 5/2009 | Holden et al. |
| 2009/0198361 A1 | 8/2009 | Schubert et al. |
| 2009/0204244 A1 | 8/2009 | Schubert et al. |
| 2009/0204738 A1 | 8/2009 | Schubert et al. |
| 2009/0210079 A1 | 8/2009 | Schubert et al. |
| 2009/0249101 A1 | 10/2009 | Lydon et al. |
| 2009/0292835 A1 | 11/2009 | Novotney et al. |
| 2009/0299506 A1 | 12/2009 | Lydon et al. |
| 2010/0009660 A1 | 1/2010 | Ishikawa |
| 2010/0049350 A1 | 2/2010 | Laefer et al. |
| 2010/0106879 A1 | 4/2010 | Laefer et al. |
| 2010/0173673 A1 | 7/2010 | Lydon et al. |
| 2010/0312931 A1 | 12/2010 | Schubert et al. |
| 2010/0312932 A1 | 12/2010 | Schubert et al. |
| 2011/0066775 A1 | 3/2011 | Schubert et al. |
| 2011/0066776 A1 | 3/2011 | Schubert et al. |
| 2011/0078354 A1 | 3/2011 | Krueger et al. |
| 2012/0272297 A1 | 10/2012 | Lydon |
| 2012/0278882 A1 | 11/2012 | Lydon et al. |

FOREIGN PATENT DOCUMENTS

| | | |
|---|---|---|
| EP | 1150472 A2 | 10/2001 |
| EP | 1498899 A1 | 1/2005 |
| EP | 1594319 A1 | 11/2005 |
| EP | 1672613 A2 | 6/2006 |
| GB | 2405718 A | 3/2005 |
| JP | 07-176351 A | 7/1995 |
| JP | 10-321302 A | 4/1998 |
| JP | 10-334993 A | 12/1998 |
| JP | 11-288420 A | 10/1999 |
| JP | 2000-214953 A | 8/2000 |
| JP | 2000-223215 A | 8/2000 |
| JP | 2000-223216 A | 8/2000 |
| JP | 2000-223218 A | 8/2000 |
| JP | 2001-014441 A | 1/2001 |
| JP | 2001-035603 A | 2/2001 |
| JP | 2001-069165 A | 3/2001 |
| JP | 2001-196133 A | 7/2001 |
| JP | 2001-230021 A | 8/2001 |
| JP | 2001-332350 A | 11/2001 |
| JP | 2002-025720 A | 1/2002 |
| JP | 2002-140304 A | 5/2002 |
| JP | 2002-203641 A | 7/2002 |
| JP | 2002-245719 A | 8/2002 |
| JP | 2002-252566 A | 9/2002 |
| JP | 3090747 U | 10/2002 |
| JP | 2002-342659 A | 11/2002 |
| JP | 2002-374447 A | 12/2002 |
| JP | 2003-017165 A | 1/2003 |
| JP | 2003-032351 A | 1/2003 |
| JP | 2003-058430 A | 2/2003 |
| JP | 2003-099729 A | 4/2003 |
| JP | 2003-274386 A | 9/2003 |
| JP | 2004-040717 A | 2/2004 |
| JP | 2004-078538 A | 3/2004 |
| JP | 2004-199138 A | 7/2004 |
| JP | 2004-259280 A | 9/2004 |
| JP | 2008053955 A | 3/2008 |
| JP | 2008071419 A | 3/2008 |
| JP | 2008-527444 A | 7/2008 |
| JP | 2009303001 A | 12/2009 |
| TW | 530267 | 5/2003 |
| WO | 99/26330 A2 | 5/1999 |
| WO | 99/48089 A2 | 9/1999 |
| WO | 00/39907 A1 | 7/2000 |
| WO | 00/60450 A1 | 10/2000 |
| WO | 01/43342 A1 | 6/2001 |
| WO | 02/23349 A1 | 3/2002 |
| WO | 02/49314 A2 | 6/2002 |
| WO | 03/036541 A1 | 5/2003 |
| WO | 03/036957 A1 | 5/2003 |
| WO | 03/056776 A1 | 7/2003 |
| WO | 03/073688 A1 | 9/2003 |
| WO | 2004/004339 A1 | 1/2004 |
| WO | 2004/084413 A2 | 9/2004 |
| WO | 2004/095772 A1 | 11/2004 |
| WO | 2004/112311 A1 | 12/2004 |
| WO | 2005/109781 A1 | 11/2005 |
| WO | 2005/119463 A2 | 12/2005 |
| WO | 2006/071364 A1 | 7/2006 |
| WO | 2006/073702 A1 | 7/2006 |

(56) References Cited

FOREIGN PATENT DOCUMENTS

| WO | 2006/080957 | A2 | 8/2006 |
|---|---|---|---|
| WO | 2007/139660 | A2 | 12/2007 |
| WO | WO2008002916 | A2 | 1/2008 |
| WO | 2011/031760 | A1 | 3/2011 |
| WO | WO2011031760 | A1 | 3/2011 |

OTHER PUBLICATIONS

Japanese Patent Office; Office Action for Application No. 2010-011810, Mailed Jul. 9, 2012. (5 pages).
Japanese Patent Office; Office Action for Application No. 2010-011810, Mailed Dec. 11, 2012. (5 pages).
Japanese Patent Office; Office Action for Application No. 2011-526100 , Mailed Dec. 13, 2012. (4 pages).
Altec Lansing, "inMotion Users Guide," Corp. Headquarters, 535 Rte.6 & 209, Milford, PA 18337. (8 pages), 2007.
Anonymous, "Future of Digital Music in Windows," Microsoft Windows Hardware Developer Central Archive, Dec. 4, 2001[Online], [retrieved on Jan. 15, 2008]. <URL:http://www.microsoft.com/whdc/archive/digitaudio.mspx> (3 pages).
Anonymous, "Introduction to Digital Audio," Microsoft Windows Hardware Developer Central Archive, Dec. 4, 2001 [Online], [retrieved on Jan. 15, 2008]. <URL:http://www.microsoft.com/whdc/archive/digitaudio.mspx> (2 pages).
Anonymous, "Windows and Red Book Audio," Microsoft Windows Hardware Developer Central Archive, Dec. 4, 2001 [Online], [retrieved Jan. 15, 2008]. <URL:http://www.microsoft.com/whdc/archive/Dmfuture.mspx> (2 pages).
"A Serial Bus on Speed Diagram: Getting Connected with FireWire," downloaded Oct. 16, 2001, PC Magazine: PC Tech (A Serial Bus on Speed) wysiwyg://51http://www.zdnet.com/pctech/content/18/10/tu1810.007.html p. 7. (2 pages).
Belkin iPod Voice Recorder, Product Specification Sheet, printed Jun. 16, 2004. (2 pages).
Bindra, "Standard Turns Monitor into I/O Hub," Electronic Engineering Times, vol. 918, Sep. 6, 1996, p. 14. (1 page).
Brentrup, "Introduction to Public Key Cryptography Demystified," Campus Technology, printed from http://www.campus-technology.com/article.asp?id=7626 on Oct. 6, 2004. (5 pages).
Brown, "Making USB Work," downloaded Oct. 16, 2001, PC Magazine: PC Tech wysiwyg:/155/http://www.zdnet.com/pcmag/pctech/content!18/04/tu1804.001.html (2 pages).
"Cables to Go," download Oct. 16, 2001 http://www.cablestogo.com/product.asp?cat%5Fid=601&sku=27028 (1 page).
Chen et al., "Design and Implemeation of a Hard Disk-Based Entertainment Device for Managing Media Contents on the Go," Consumer Electonics, 1005. (ISCE 2005). Proceedings of the Ninth International Symposium on, pp. 328-333, Jun. 14-16, 2005. (6 pages).
Crawford et al., "Sample rate conversion and bit rate reduction in the studio," IEEE Colloquium on Digital Audio Signal Processing, May 22, 1991, pp. 8/1-8/3. (3 pages).
Derman, "Monitors Make Net Connections," Electronic Engineering Times, vol. 933, 1996, pp. 60 and 69. (2 pages).
"ExpressBus™ F5U0I0," User Guide Packing Checklist, Belkin Components Product Warranty. (2 pages).
"FireWire", downloaded Oct. 16, 2001; si wyg:/ /4 2/http://developer.apple.com/hardware/Fire Wire (2 pages).
"Fire Wire Connector," downloaded Oct. 16, 2001, wysiwyg://76/http://developer.apple.com/...es/Macintosh_CPUs-G3/ibook/ibook-27.html (2 pages).
Fried, "FireWire poised to become ubiquitous," downloaded Oct. 16, 2001, CNET News.com, 1394 Trade Association: Press, wysiwyg:/132/http:/ 11394ta.org/Press/200 1 Press/august!8.2 7. b.html (3 pages).
Fried, "New Fire Wire to blaze faster trail," downloaded Oct. 16, 2001, CNET News.com http://news.cnet.com/news/0-I006-200-6021210.html (5 pages).

"How to Connect Your Computer PC Hardware", downloaded Oct. 16, 2001, http:///www.scar.utoronto.ca!~ccweb/faculty/connect-howto.html (5 pages).
"IEEE 1394/USB Comparison," downloaded Oct. 16, 2001, www.genitech.com.aulLIBRARY/TechSupportiinfobits/firewirevsusb.html (4 pages).
"Introduction to Public Key Cryptography," Oct. 9, 1998, printed from http://developer.netscape.com/docs/manuals/security/pkin/contents.html on Oct. 6, 2004. (21 pages).
iPod Classic User's Guide, acquired from apple.com, 2002. (44 pages).
iPod nano Features Guide, acquired from apple.com, 2008. (72 pages).
iPod touch User's Guide, acquired from apple.com, 2008. (120 pages).
Lambert, "Digital Audio Interfaces," Journal of the Audio Engineering Society, Audio Engineering Society, New York, NY, vol. 38, No. 9, (Sep. 1, 1990), pp. 681-684, 686, 688, 690, 692 and 696, XP000175146 ISSN: 1549-4950 figures 9, 10. (10 pages).
Lewis, "On Technology" Fortune Magazine, Dec. 9, 2002, p. 240. (1 page).
LSI Logic's Broadcast PC Card Brings New Multimedia Capabilities to Personal Computing. (Nov. 16). PR Newswire, 1. Retrieved Jun. 26, 2010, from Business Dateline. (3 pages).
MAXTech Technology Ltd., CES 2000/Las Vegas, Jan. 6-9, 2000, [on line], [retrieved on Sep. 26, 2008]. Retrieved from the Internet <URL: http://web.archive.org/web/20000930170634/www.maxtech.com.hk/t-details.htm>. (2 pages).
MAXTech Technology Ltd., CES 2000/Las Vegas, Jan. 6-9, 2000, [online], [retrieved on Sep. 23, 2008]. Retrieved from the Internet <URL: http://web.archive.org/web/20010223230441/www.maxtech.com.hk/g-p06.htm>. (2 pages).
Menezes et al., "Handbook of Applied Cryptography," *Identification and Entity Authentication*, Jan. 1, 1997, pp. 385-424. (41 pages).
"MPV™ Music Profile Specification Revision 1.00" Internet Citation [online] (Jan. 7, 2004) URL:http//www.osta.org/mpv/public/specs/MPVMusic-Prof-Spec-1.00.pdf> [retrieved Jun. 20, 2006] the whole document. (70 pages).
Networking Tech Note, "1394 Standards and Specifications." (3 pages).
"Neuros MP3 Digital Audio Computer," www.neurosaudio.com, downloaded Apr. 9, 2003. (6 pages).
NOMAD II Player Version 1.0 (CLI) (User's Manual), Creative Technology, Ltd., Jan. 2000. (46 pages).
"PMC FW2 IEEE1394 FireWire Controller", downloaded Oct. 16, 2001, http://www.bvmltd.co.uk/PMCfw2ds.html (10 pages).
Severance, "FireWire Finally Comes Home," Michigan State University, Standards, Nov. 1998, pp. 117-118. (2 pages).
Sinitsyn, "Synchronization Framework for Personal Mobile Servers," Pervasive Computing and Communications Workshops (PERCOMW'04), Proceedings of the Second IEEE Annual Conference, Piscataway, NJ, USA, IEEE, Mar. 14, 2004, pp. 208-212. (3 pages).
Slay et al., "iPod Forensics: Forencically Sound Examination of an Apple iPod," *System Sciences*, 2007. HICSS 2007. 40th Annual Hawaii Internation Conference on, pp. 1-9, Jan. 2007. (9 pages).
Teener, "Understanding Fire Wire: The IEEE 1394 Standards and Specifications," downloaded Oct. 16, 2001, wysiwyg:119/http:1Iwww.chipcenter.com/networking/ieee_1394/main.html (5 pages).
"The Authoritative Dictionary of IEEE Standards Terms, Seventh Edition," Published by Standards Information Network, IEEE Press, 2000. (3 pages).
"Universal Serial Bus Specification—Rev 2.0 " *Chapter 6: Compaq Hewlett-Packard*, Apr. 27, 2000, pp. 85, 99-100. (7 pages).
"Universal Serial Bus Specification—Rev 2.0," XP002474828, *Chapter 9: USB Device Framework*, pp. 239-274. (36 pages), Apr. 27, 2000.
Vitaliano, "Why FireWire is Hot!Hot!Hot!" downloaded Oct. 16, 2001, "Impact.FireWire.SideBar" http://www.vxm.com/21R.35.html (4 pages).

(56) References Cited

OTHER PUBLICATIONS

Whittle, "Public Key Authentication Framework: Tutorial," First Principles Consulting, Jun. 2, 1996, downloaded Oct. 6, 2004, http://www.ozemail.com.au/~firstpr/crypto/pkaftute.htm (7 pages).

The First Office Action in Chinese Application No. 200910222182.6, mailed Nov. 23, 2011.

European Patent Office, Decision to Refuse a European Patent Application; Application No. 07 812 335., Dated Jan. 11, 2011; Mailed Jan. 19, 2011 , (18 pages).

Notice of Final Rejection dated Jan. 26, 2011 from Korean Patent Application No. 10-2008-7030334 (9 pages).

European Patent Office, Search Report for European Patent Application No. 10194370.2, Mailed Feb. 6, 2012 (9 pages).

European Patent Office, Office Action, Application No. 09 791 751.2, Mailed Oct. 19, 2012, 7 pages.

European Patent Office, Office Action, Application No. 07 799 051.3, Mailed Sep. 24, 2012, 7 pages.

Janssen, Jan, "A Single-Chip Universal Serial Bus D/A Converter for High-Quality Audio Signals," THPM 16.7 IEEE 19970611; 19970611-19970613, Jun. 11, 1997, (2 pages ).

Office Action for European Patent Application No. 10194377.7, mailed Apr. 15, 2013, 6 pages.

International Search Report, dated Aug. 21, 2008, for PCT Patent Application No. PCT/US2007/072127, 5 pages.

Written Opinion, dated Dec. 27, 2008, for PCT Patent Application No. PCT/US2007/072127, 5 pages.

International Preliminary Report on Patentability dated Jan. 6, 2009, for PCT Patent Application No. PCT/US2007/072127, 6 pages.

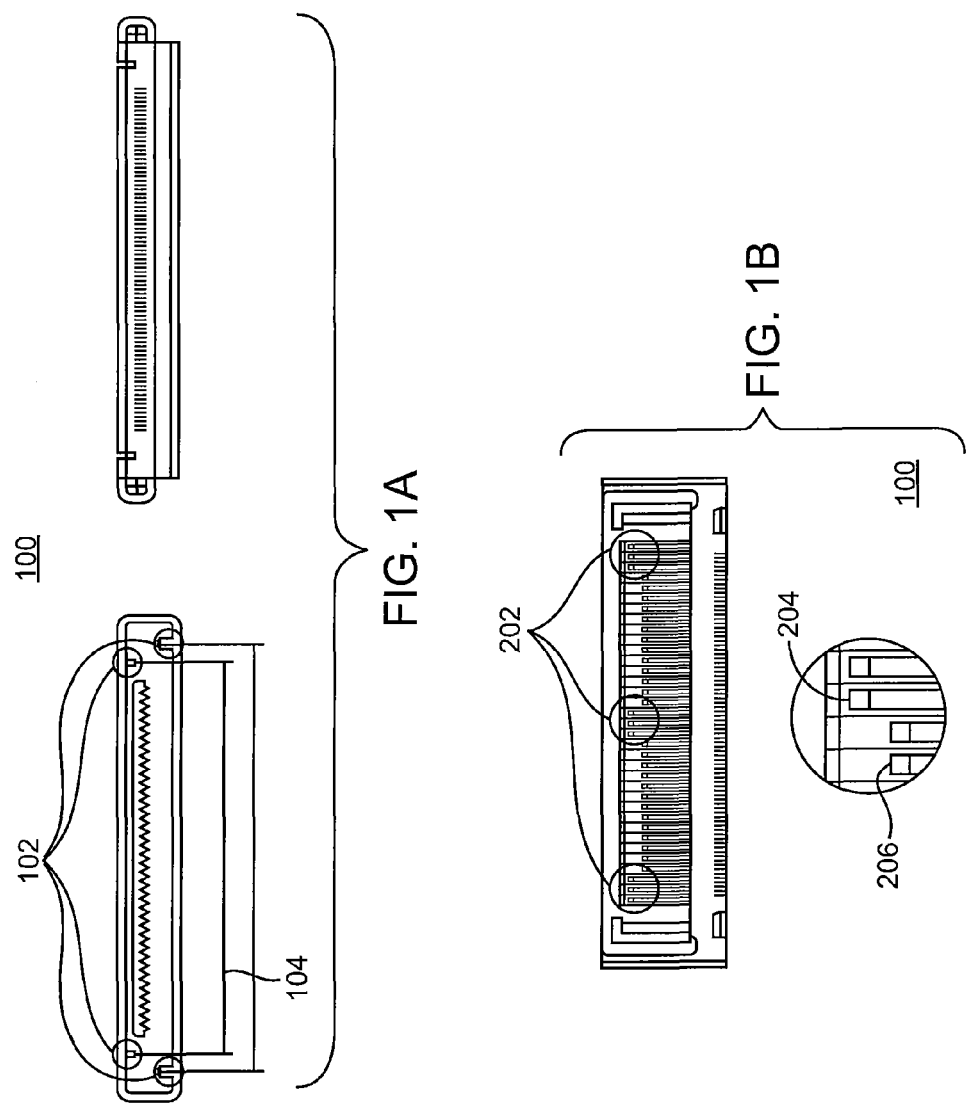

| Pin | Signal Name | I/O | Function |
|---|---|---|---|
| 1 | DGND | GND | Digital Ground |
| 2 | DGND | GND | Digital Ground |
| 3 | TPA+ | I/O | FireWire signal |
| 4 | USB D+ | I/O | USB signal |
| 5 | TPA- | I/O | FireWire signal |
| 6 | USB D- | I/O | USB signal |
| 7 | TPB+ | I/O | FireWire signal |
| 8 | USB PWR | I | USB power in; used to detect USB hub |
| 9 | TPB- | I/O | FireWire signal |
| 10 | Accessory Identify | I | Connection for accessory identification resistor |
| 11 | F/W PWR+ | I | Firewire and charger input power (8V to 15V dc) |
| 12 | F/W PWR+ | I | Firewire and charger input power (8V to 15V dc) |
| 13 | Accessory Pwr | O | Nominal 3.3V output; current limited to 100 mA |
| 14 | Reserved | | |
| 15 | DGND | GND | Digital Ground |
| 16 | DGND | GND | Digital Ground |
| 17 | Reserved | | |
| 18 | Rx | I | Serial protocol input to media player |
| 19 | Tx | O | Serial protocol output from media player |
| 20 | Accessory Detect | I | Connection for accessory identification resistor |
| 21 | S Video Y | O | Luminance component for S-video |
| 22 | S Video C | O | Chrominance component for S-video |
| 23 | Composite Video | O | Composite video signal |
| 24 | Remote sense | I | Detect remote |
| 25 | LINE-IN L | I | Line level input for left audio channel |
| 26 | LINE-IN R | I | Line level input for right audio channel |
| 27 | LINE-OUT L | O | Line level output to left audio channel |
| 28 | LINE-OUT R | O | Line level output to right audio channel |
| 29 | Audio Return | --- | Signal, not to be grounded in accessory |
| 30 | DGND | GND | Digital ground |
| 31 | Chassis | | Chassis ground for connector shell |
| 32 | Chassis | | Chassis ground for connector shell |

FIG. 3A

| Pin | Signal Name | I/O | Function |
|---|---|---|---|
| 1 | Audio Out Left / Mono Mic In | I/O | 30mW audio out left channel, also doubles as mono mic in |
| 2 | HP Detect | I | Internal Switch to detect plug insertion |
| 3 | Audio Return | GND | Audio return for left and right audio |
| 4 | Audio Out Right | O | 30mW audio out right channel |
| 5 | Composite Video | O | Video Signal |
| 6 | Accessory 3.3 V | O | 3.3V Accessory power 100mA max |
| 7 | Tx | O | Serial protocol (Data from iPod to Device) |
| 8 | Rx | I | Serial protocol (Data to iPod from Device) |
| 9 | D GND | GND | Digital ground for accessory |

FIG. 3B

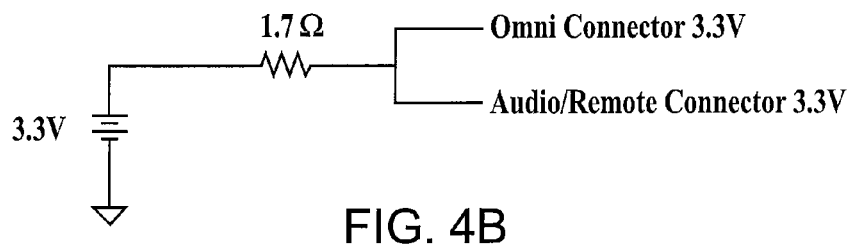

FIG. 4B

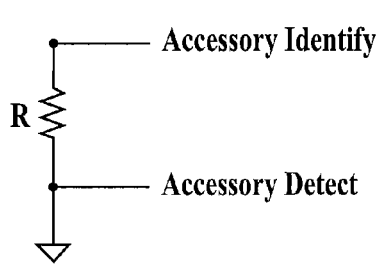

FIG. 4C

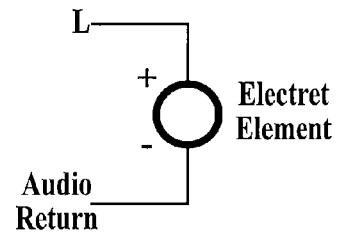

FIG. 4D

METHOD AND SYSTEM FOR AUTHENTICATING AN ACCESSORY

CROSS-REFERENCES TO RELATED APPLICATIONS

This application is a Continuation of U.S. patent application Ser. No. 11/476,999, filed on Jun. 27, 2006, now U.S. Pat. No. 8,117,651 issued on Feb. 14, 2012, the disclosure of which is incorporated by reference herein in its entirety for all purposes.

FIELD OF THE INVENTION

The present invention relates generally to electrical devices and more particularly to electronic devices such as media players that communicate with accessory devices.

BACKGROUND OF THE INVENTION

A media player stores media assets, such as audio tracks or photos that can be played or displayed on the media player. One example of a media player is the iPod® media player, which is available from Apple Inc. of Cupertino, Calif. Often, a media player acquires its media assets from a host computer that serves to enable a user to manage media assets. As an example, the host computer can execute a media management application to manage media assets. One example of a media management application is iTunes®, version 6.0, produced by Apple Inc.

A media player typically includes one or more connectors or ports that can be used to interface to the media player. For example, the connector or port can enable the media player to couple to a host computer, be inserted into a docking system, or receive an accessory device. There are today many different types of accessory devices that can interconnect to the media player. For example, a remote control can be connected to the connector or port to allow the user to remotely control the media player. As another example, an automobile can include a connector and the media player can be inserted onto the connector such that an automobile media system can interact with the media player, thereby allowing the media content on the media player to be played within the automobile.

Numerous third-parties have developed accessories for use with media players. An accessory may be used with the media player as long as a compatible connector or port is utilized. Accessories interact with the media player using an accessory protocol. One example of an accessory protocol is referred to as iPod Accessory Protocol (iAP), which is available from Apple, Inc. of Cupertino, Calif. The accessory protocol includes commands which have been typically been made freely accessible to accessory developers. A problem with the commands being freely accessible is that they can be used by unauthorized or counterfeit accessory devices.

One solution is to perform authentication operations on an accessory device. Accordingly, the accessory devices would not have any access to the media player until after the authentication process is complete.

Thus, there is a need for improved techniques to control the nature and extent to which accessory devices can be utilized with other electronic devices.

BRIEF SUMMARY OF THE INVENTION

A method, system, and connector interface for authenticating an accessory are disclosed. The method includes performing a first authentication operation on the accessory by the media player, where an authentication certificate is validated; and performing a second authentication operation on the accessory by the media player, where an authentication signature is validated.

According to the system and method disclosed herein, the media player and accessory may utilize a plurality of commands in a variety of environments such as within a connector interface system environment to control access to the media player.

BRIEF DESCRIPTION OF THE DRAWINGS

FIGS. 1A and 1B illustrate a docking connector in accordance with the present invention.

FIG. 3A illustrates the connector pin designations for the docking connector.

FIG. 3B illustrates the connection pill designations for the remote connector.

FIG. 4B illustrates a reference schematic diagram for an accessory power source.

FIG. 4C illustrates a reference schematic diagram for a system for detecting and identifying accessories for the docking connector.

FIG. 4D is a reference schematic of an electret microphone that may be connected to the remote connector.

DETAILED DESCRIPTION OF THE INVENTION

Figure 2A:
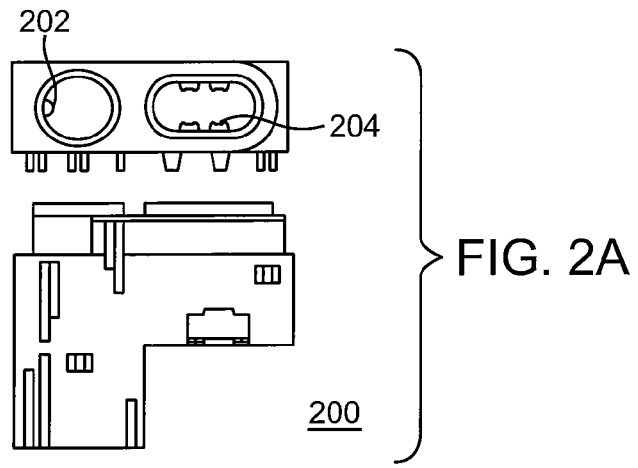
FIG. 2A is a front and top view of a remote connector in accordance with the present invention.

The present invention relates generally to electrical devices and more particularly to electrical devices such as media players that communicate with accessory devices. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

A method and system in accordance with the present invention are provided for authenticating an accessory. The method includes performing a first (background) authentication operation on the accessory by the media player, wherein an authentication certificate is validated. In one embodiment, the authentication operations are handled in the background such that the media player is operative to process commands after authentication has begun but before the authentication has completed. This allows the media player and the accessory to interact immediately rather than waiting until after the authentication process has completed successfully. The method also includes performing a second authentication operation on the accessory by the media player, wherein an authentication signature is validated. In one embodiment, the media player verifies the authentication signature using a public key provided in the certificate. The media player and accessory may utilize a plurality of commands in a variety of environments to facilitate controlling access to the media player. One such environment is within a connector interface system environment such as described in detail herein below.

Although the authentication of an accessory is described herein below, one of ordinary skill in the art recognizes that the procedures described below may be applied to the authentication of the media player and such application would be within the spirit and scope of the present invention.

Connector Interface System Overview

To describe the features of the connector interface system in accordance with the present invention in more detail, refer now to the following description in conjunction with the accompanying drawings.

Docking Connector

FIGS. 1A and 1B illustrate a docking connector 100 in accordance with the present invention. Referring first to FIG. 1A, the keying features 102 are of a custom length 104. In addition, a specific key arrangement is used where one set of keys is separated by one length at the bottom of the connector and another set of keys is separated by another length at the top of the connector. The use of this key arrangement prevents noncompliant connectors from being plugged in and causing potential damage to the device. The connector for power utilizes a Firewire specification for power. The connector includes a first make/last break contact to implement this scheme. FIG. 1B illustrates the first make/last break contact 202 and also illustrates a ground pin and a power pin related to providing an appropriate first make/last break contact. In this example, the ground pin 204 is longer than the power pin 206. Therefore, the ground pin 204 would contact its mating pin in the docking accessory before the power pin 206, minimizing internal electrical damage of the electronics of the device.

In addition, a connector interface system in accordance with the present invention uses universal serial bus (USB), universal asynchronous receiver-transmitter (UART), and Firewire interfaces as part of the same docking connector alignment, thereby making the design more compatible with different types of interfaces, as will be discussed in detail hereinafter. In so doing, more remote accessories can interface with the media player.

Remote Connector

Figure 2B:
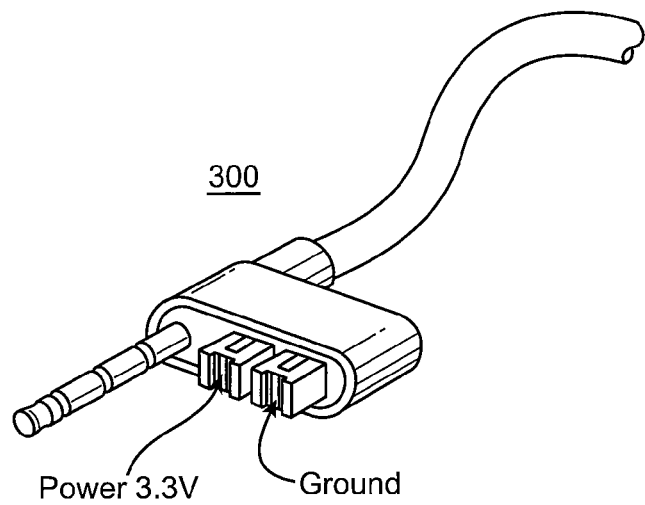
FIG. 2B illustrates a plug to be utilized in the remote connector.
Figure 2C:
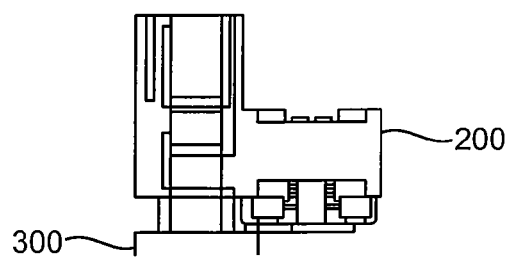
FIG. 2C illustrates the plug inserted into the remote connector.

The connection interface system also includes a remote connector which provides for the ability to output and input audio, provides I/O serial protocol, and provides an output for video. FIG. 2A is a front and top view of a remote connector 200 in accordance with the present invention. As is seen, the remote connector 200 includes a top headphone receptacle 202, as well as a second receptacle 204 for remote devices. FIG. 2B illustrates a plug 300 to be utilized in the remote connector. The plug 300 allows the functions to be provided via the remote connector. FIG. 2C illustrates the plug 300 inserted into the remote connector 200. Heretofore, all of these features have not been implemented in a remote connector. Therefore, a standard headphone cable can be plugged in, but also special remote control cables, microphone cables, and video cables could be utilized with the remote connector.

To describe the features of the connector interface system in more detail, please find below a functional description of the docking connector, remote connector and a command set in accordance with the present invention.

Docking and Remote Connector Specifications

For an example of the connector pin designations for both the docking connector and for the remote connector for a media player such as an iPod® device by Apple, Inc., refer now to FIGS. 3A and 3B. FIG. 3A illustrates the connector pin designations for the docking connector. FIG. 3B illustrates the connection pin designations for the remote connector.

Docking Connector Specifications

Figure 4A:
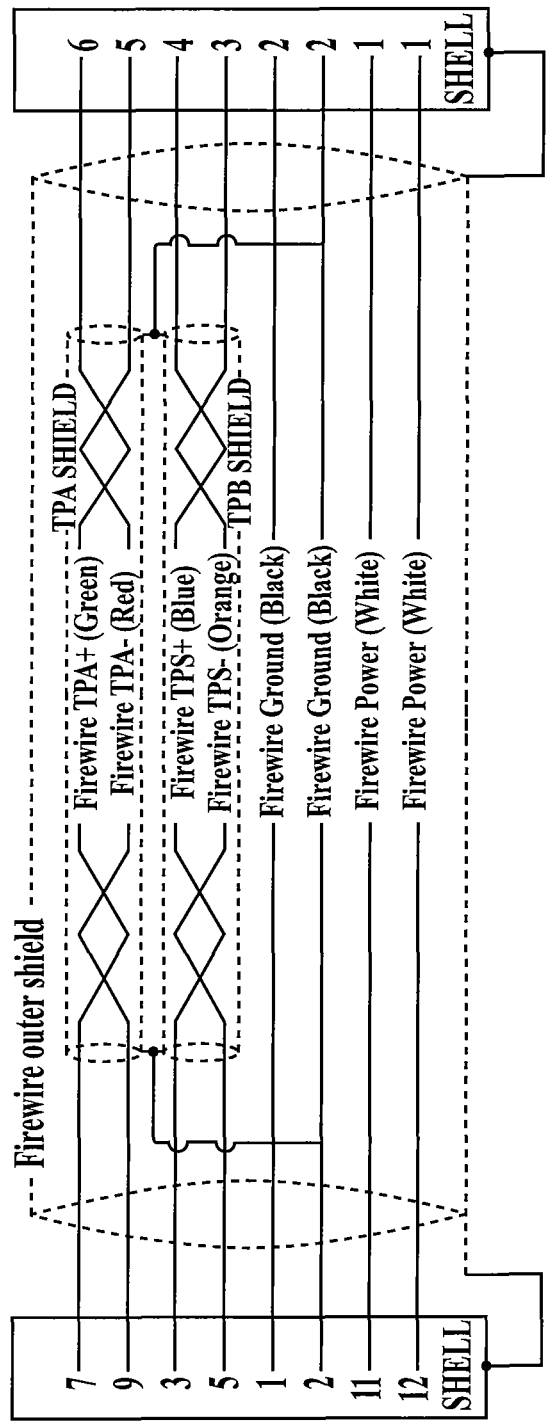
FIG. 4A illustrates a typical FireWire connector interface for the docking connector.

FIG. 4A illustrates a typical Firewire connector interface for the docking connector. The following are some exemplary specifications: Firewire power (8V-30V DC IN, 10 W Max). In one embodiment, Firewire may be designed to the IEEE 1394 A Spec (400 Mb/s).

USB Interface

The media player provides two configurations, or modes, of USB device operation: mass storage and media player USB Interface (MPUI). The MPUI allows the media player to be controlled using a media player accessory protocol (MPAP) which will be described in detail later herein, using a USB Human Interface Device (HID) interface as a transport mechanism.

Accessory 3.3 V Power

FIG. 4B illustrates the accessory power source. The media player accessory power pin supplies voltages, for example, 3.0 V to 3.3V+/−5% (2.85 V to 3.465 V) over the 30-pin docking connector and remote connector (if present). A maximum current is shared between the 30-pin docking and Audio/Remote connectors.

By default, the media player supplies a particular current such as 5 mA. Proper software accessory detection is required to turn on high power (for example, up to 100 mA) during active device usage. When devices are inactive, they must consume less than a predetermined amount of power such as 5 mA current.

Accessory power is grounded through the Digital GND pins.

FIG. 4C illustrates a reference schematic diagram for a system for detecting and identifying accessories for the docking connector. The system comprises a resistor to ground that allows the device to determine what has been plugged into the docking connector. There is an internal pull-up on Accessory Identify within the media player. Two pins are required (Accessory Identify & Accessory Detect).

FIG. 4D is a reference schematic of an electret microphone that may be connected to the remote connector.

Serial Protocol Communication:

a) Two pins used to communicate to and from device (Rx & Tx)

b) Input & Output (OV=Low, 3.3V=High)

Figure 5A:
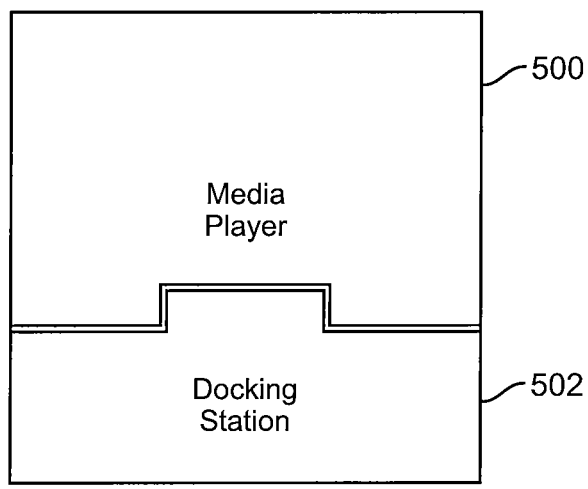
FIG. 5A illustrates a media player coupled to different accessories.
Figure 5B:
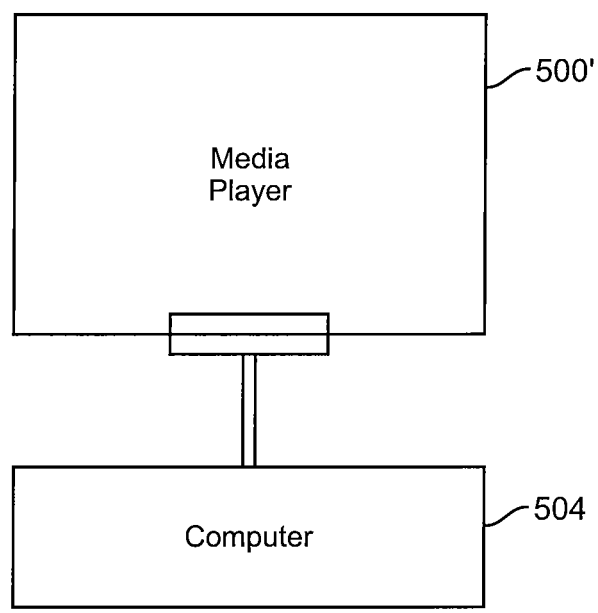
FIG. 5B illustrates the media player coupled to a computer.
Figure 5C:
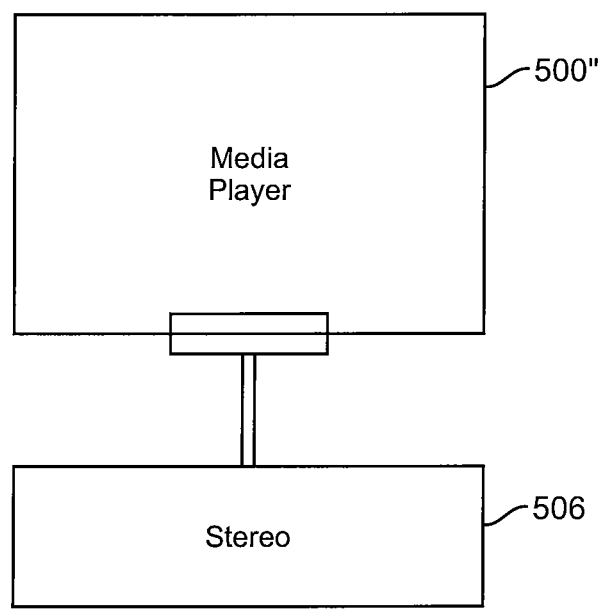
FIG. 5C illustrates the media player coupled to a car or home stereo system.
Figure 5D:
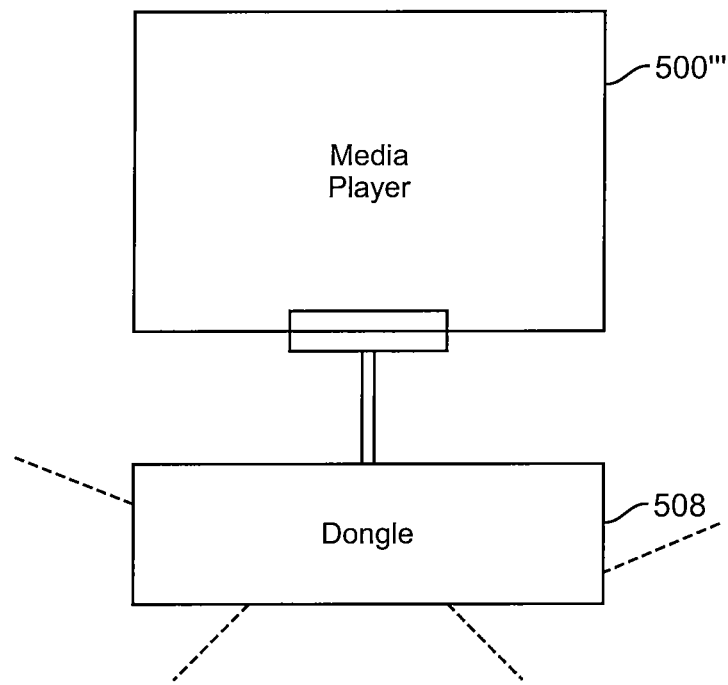
FIG. 5D illustrates the media player coupled to a dongle that communicates wirelessly with other accessories.
Figure 5E:
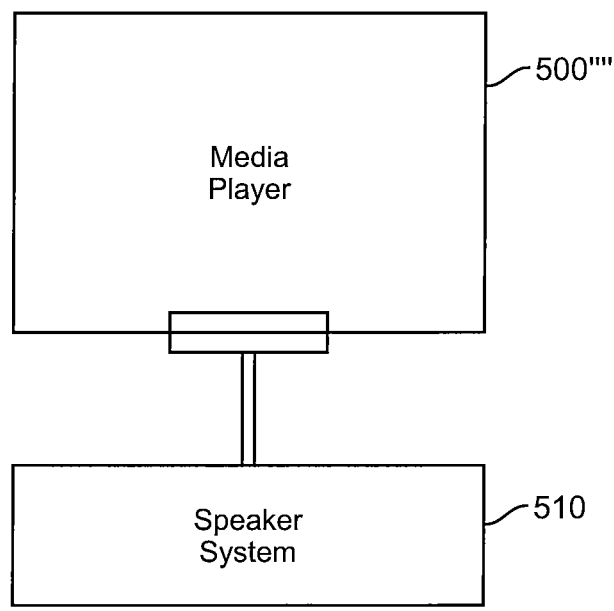
FIG. 5E illustrates the media player coupled to a speaker system.

As mentioned previously, media players connect to a variety of accessories. FIGS. 5A-5E illustrate a media player 500 coupled to different accessories. FIG. 5A illustrates a media player 500 coupled to a docking station 502. FIG. 513 illustrates the media player 500' coupled to a computer 504. FIG. 5C illustrates the media player 500" coupled to a car or home stereo system 506. FIG. 5D illustrates the media player 500'''coupled to a dongle 508 that communicates wirelessly with other devices. FIG. 5E illustrates the media player 500"" coupled to a speaker system 510. As is seen, what is meant by accessories includes but is not limited to docking stations, chargers, car stereos, microphones, home stereos, computers, speakers, and accessories which communicate wirelessly with other accessories.

As mentioned previously, this connector interface system could be utilized with a command set for authenticating an accessory. In one embodiment, the accessory may be a host computer or any other electronic device or system that may communicate with the media player. It should be understood by one of ordinary skill in the art that although the above-identified connector interface system could be utilized with the command set, a variety of other connectors or systems could be utilized and they would be within the spirit and scope of the present invention.

As described above, accessories interact with the media player using a media player accessory protocol. An example of such a media player accessory protocol is the iPod Accessory Protocol (iAP). The media player accessory protocol refers to the software component executing on the media player that communicates with accessories over a given transport layer. The application of the media player may be, for example, a media player application framework that presents menus/screens to the user. Media player commands are associated with the processing of voice, video, and other data between the media player and the accessory. For example, commands may be associated with read operations and write operations to transfer and store information between the media player and the accessory. Accordingly, in one embodiment, for each command related to the media player, there is a reciprocal command for the accessory. In one embodiment, commands may be grouped and associated with specific accessory functionality.

Command Functionality

Although a plurality of commands is described herein below, one of ordinary skill in the art recognizes that many other commands could be utilized and their use would be within the spirit and scope of the present invention. Accordingly, the list of commands below is representative, but not exhaustive, of the types of commands that could be utilized to authenticate an accessory. Furthermore, it is also readily understood by one of ordinary skill in the art that a subset of these commands could be utilized by a media player or an accessory and that use would be within the spirit and scope of the present invention. A description of the functionality of some of these commands is described below.

Authentication of an Accessory

In previous authentication methods, the accessory transmits an identification message to the media player, where the identification message indicates that the accessory supports certain commands and supports authentication. The media player then transmits an acknowledgment message to the accessory. The media player then blocks access by the accessory until the entire authentication process completes. The media player may display a "Connecting . . . " screen. The media player then confirms that the authentication version number that the accessory provides is the correct version number. If so, the media player transmits a challenge to be signed by the device. The media player then validates the authentication signature using a public key based on a device ID from the accessory. The following describes improvements over the previous authentication methods, in accordance with the present invention.

Figure 6:
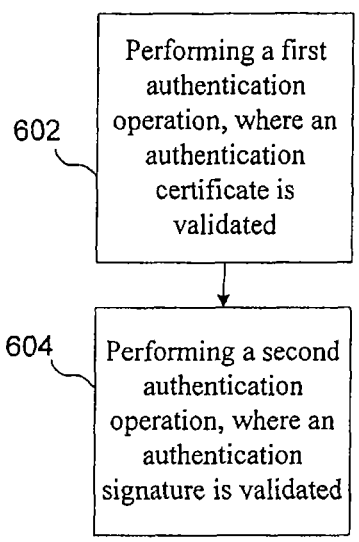
FIG. 6 is a flow chart, which illustrates a process for controlling access to a media player.

FIG. 6 is a flow chart, which illustrates a process for controlling access to a media player, in accordance with the present invention. As FIG. 6 illustrates, the process begins in step 602 where the media player performs a background authentication operation on the accessory, where the authentication certificate is validated. More specifically, during the background authentication operation, the accessory transmits authentication information to the media player, and the media player receives and then validates the certificate contained in the authentication information. In one embodiment, the authentication information may also include an authentication version number. Authentication certificates are described in more detail below. As described in more detail below, the media player does not wait until the entire authentication process completes but instead allows certain access before the authentication process completes. Next, in step 604, the media player performs a second authentication operation on the accessory, where an authentication signature is validated. More specifically, during the second authentication operation, the accessory transmits an authentication signature to the media player, and the media player receives and then validates the authentication signature. In one embodiment, the media player verifies the authentication signature using a public key. More detailed embodiments of the background authentication and second authentication operations are described below and shown in FIG. 7.

Although the authentication of an accessory is described herein, one of ordinary skill in the art recognizes that the procedures described herein may be applied to the authentication of the media player, and such applications would be within the spirit and scope of the present invention. For example, the same or similar steps described in FIG. 6 above and/or in FIG. 7 below may be utilized by an accessory to authenticate the media player.

Authentication Certificates

Standard authentication certificates function as containers for data such as the certificate creator (issuer, country, etc.), certificate type, valid certificate date ranges, and other metadata. Authentication certificates, also referred to as certificates or certs, are generated and signed by one or more certificate authorities (CAs) and have a unique serial number. In one embodiment, the certificate may be stored in an authentication coprocessor chip on the accessory. Authentication certificates in accordance with the present invention contain not only the metadata as in a standard authentication certificate but also device class information and a public key, which are described in more detail below.

As described in more detail below, the media player verifies certificates using a public key that is issued by the CA. The media player may also use the public key to verify a signed challenge. Certificates are used to transfer the public key and other accessory-specific information to the media player. Such accessory-specific information may contain, for example, device class information about the accessory. The device class determines what commands the accessory is permitted to use with respect to the media player. In one embodiment, the media player may add permissible commands to existing classes or add new device classes by means of a media player firmware update. New accessories may be supported by the media player when the CA issues new certificates to the accessory vendor.

In one embodiment, if a certificate is somehow compromised and cloned in counterfeit devices, the compromised serial number may be added to a certificate revocation list (or CRL) on the media player to prevent devices using the certificate from authenticating successfully. If the certificate parser of the media player does not recognize the cert's device class, the media player will reject the certificate. In one embodiment, a certificate to be used for device authentication may have a preset lifespan (e.g., in the range of 1-5 years, etc.), which may be set, for example, by a date. In one embodiment, certificate expiration could be accomplished by adding device serial numbers to the CRL after the expiration date has passed.

Figure 7:
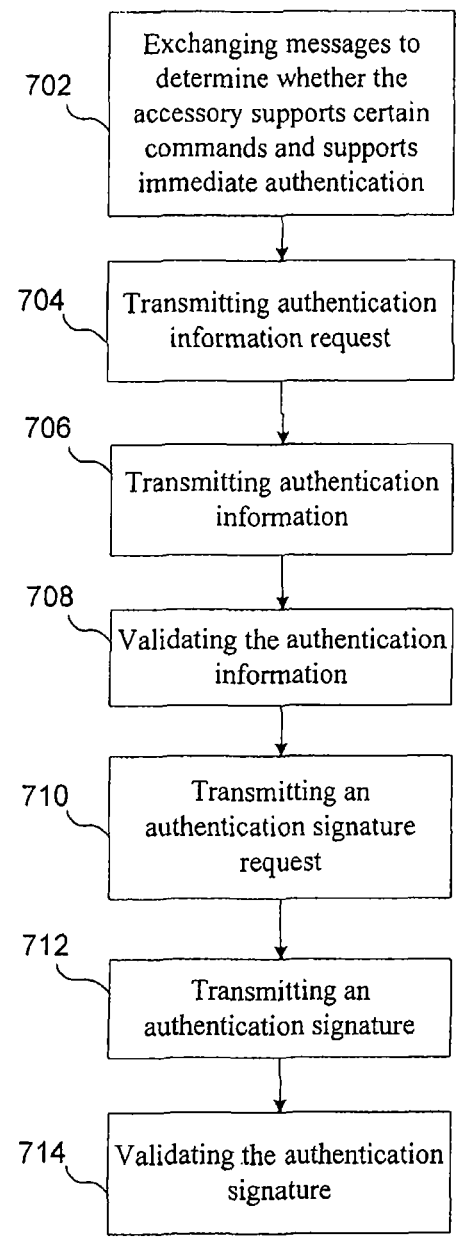
FIG. 7 is a flow chart, which illustrates a process for authenticating an accessory.

FIG. 7 is a flow chart, which illustrates a process for authenticating an accessory, in accordance with the present invention. As FIG. 7 illustrates, the process begins in step 702 where the media player and accessory exchange messages to determine whether the accessory supports certain commands and supports immediate authentication. More specifically, in one embodiment, the accessory transmits an identification message to the media player. The identification message includes a device identification (ID) and an indication that the accessory supports certain commands and supports authentication. In a preferred embodiment, support for immediate authentication is required. The media player then transmits an acknowledgment message to the accessory. In one embodiment, the media player notifies the application of the media player that the accessory is attempting to access the media player.

As described above, in one embodiment, the authentication operations are handled in the background to allow multiple cryptography options (e.g., RSA or SFEE) with/without hardware acceleration to be used. As a result, the media player is operative to process device commands after authentication has begun, before the authentication has completed, and through its successful completion. When device authentication fails (e.g., retry count and/or maximum time has been exhausted), the media player could lockout processing of incoming commands and prevent the device from interacting with media player. Media player applications will need to permit non-risky device use once authentication has started. Risky behavior is defined as anything that could permanently alter the media player behavior or download unsafe media. Examples of risky behavior to be avoided could be downloading executable media, or firmware updates. If authentication fails at some later point, the application of the media player could cancel any device-related activities and possibly report an error to the user (e.g., "Device is not supported").

Referring still to FIG. 7, in step 704, during the background authentication operation, the media player transmits an authentication information request to the accessory. In one embodiment, the media player starts a timeout timer. Next, in step 706, the accessory transmits the authentication information to the media player. In one embodiment, the authentication information includes an authentication major version, an authentication minor version, and a public certificate, where the certificate may be divided up into sections if it is large (e.g., greater than 500 bytes). If the certificate is divided up into sections, upon receipt of the authentication information, the media player reassembles the certificate. When the certificate is fully assembled, the certificate is parsed for device class information. The media player then converts a class number from the device class information into an allowed command mask. This mask is used to validate that the commands identified by the device are allowed by the certificate. In other words, the media player validates the certificate based at least in part on the device class information.

Next, in step 708, the media player validates the authentication information. The authentication information may be invalid for a number of reasons. For example, the authentication information may be invalid if the authentication version is not valid, if the public certificate has expired or is on the certificate revocation list (CRL). If any of the authentication information is invalid, the background authentication operation fails. A failure will restart the authentication process (if a retry count and timeout limits have not been exceeded). The background authentication operation passes if the authentication version is validated and if the certificate class commands have been determined to match or exceed those requested by an identify command of the media player, and if a certification chain has been verified. In one embodiment, non-risky media player command application functions and command processing are enabled while authentication process continues. In one embodiment, the media player may transmit a message to the accessory indicating a version information status.

Next, in step 710, during a second authentication operation, the media player transmits an authentication signature request to the accessory. The authentication signature request includes a random nonce/challenge to be signed by the device. The specific nonce/challenge length may vary and will depend on the specific implementation. Next, in step 712, the accessory transmits an authentication signature (i.e., a message with a signed challenge/signature) to the media player. Next, in step 714, upon receipt of the authentication signature, the media player validates the authentication signature (i.e., the signed challenge). In one embodiment, the media player verifies the signed nonce/challenge using a public key based on a device ID from the accessory. In a preferred embodiment, the media player verifies the signed nonce/challenge using a public key from the certificate provided by the accessory.

In one embodiment, an accessory authentication process (AAP) is based on a public key/private key system where the accessory has a private key and the media player has the associated public key. The accessory authentication process is closely integrated with accessory protocol commands.

Before completing the authentication process, the media player transmits an authentication status message to the accessory indicating signature status and authentication process completion. The authentication passes if the media player verifies the authentication signature. Otherwise, the authentication process fails. If authentication passes, the application of the media player unblocks to allow user access to the device.

If the authentication process fails, the device port of the media player will lock out the accessory. Also, upon a failure, the media player de-authorizes the accessory to prevent the accessory from utilizing the media player resources. In one embodiment, the media player may also transmit an authentication status to the application of the media player. For example, if the authentication fails, the application of the media player may display a "Connection Failed" message.

In one embodiment, the authentication operations may utilize a retry count and maximum timeout. Accordingly, in one embodiment, the authentication can also fail if the retry counter or maximum timeout is exceeded. Locking out a port prevents an accessory from simulating a detach or re-identifying in order to reset the authentication retry/timeout counters. In one embodiment, incoming packets may be deleted if a device port authentication state is set to "lockout." This will prevent any locked out device packets from being processed. In one embodiment, if the failure is due to an accessory identifying more commands than allowed by the certificate, the device lockout will not be activated at authentication failure and the accessory may be permitted to re-identify.

A method, system, and connector interface for authenticating an accessory has been disclosed. The method includes performing a first authentication operation on the accessory by the media player, where an authentication certificate is validated. The method also includes performing a second authentication operation on the accessory by the media player, where an authentication signature is validated.

According to the system and method disclosed herein, the media player and accessory may utilize a plurality of commands in a variety of environments such as within a connector interface system environment to control access to the media player.

Although the present invention has been described in accordance with the embodiments shown, one of ordinary skill in the art will readily recognize that there could be variations to the embodiments and those variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

What is claimed is:

1. A media player comprising:
    a processor; and
    an accessory interface coupled to the processor and configured to communicate with an accessory according to a media player accessory protocol that defines a plurality of application commands to invoke a plurality of media player application functions,
    wherein the processor in conjunction with the accessory interface is configured to:
        initiate an authentication operation to authenticate the accessory;
        receive first authentication information from the accessory;
        validate the first authentication information;
        receive one of the plurality of application commands of the media player accessory protocol from the accessory based on validation of the first authentication information;
        in response to the received application command, invoke one of the plurality of media player application functions;
        receive second authentication information from the accessory, the second authentication information being different from the first authentication information;
        validate the second authentication information to determine that authentication operation completed successfully; and
        receive a subsequent one of the plurality of application commands from the accessory and, in response to the subsequent application command, invoke a subsequent one of the plurality of media player application functions.

2. The media player of claim 1 wherein the processor is further configured to ignore any subsequent application command received from the accessory if the authentication operation fails.

3. The media player of claim 1 wherein the first authentication information includes one or more of: an authentication certificate, an authentication major version information, and an authentication minor version information.

4. The media player of claim 3 wherein the processor is further configured to:
    receive a device identification message from the accessory, the device identification message including an indication of a command set supported by the accessory, the supported command set including at least some of the plurality of commands defined by the media player accessory protocol;
    determine an allowed command set for the accessory based on the authentication information included in the authentication certificate; and
    compare the allowed command set to the supported command set,
    wherein the authentication operation fails in the event that the allowed command set does not match the supported command set.

5. The media player of claim 3 wherein the second authentication information comprises a digital signature that includes a digitally signed version of a random challenge transmitted to the accessory by the media player.

6. The media player of claim 5 wherein the digitally signed version of the random challenge is signed by the accessory using a private key and wherein the processor is configured to:
    extract a public key from the authentication certificate; and
    use the public key to validate the digital signature.

7. The media player of claim 1 wherein the processor is further configured to:
    receive a device identification message from the accessory, the device identification message including an indication of a command set supported by the accessory, the command set including at least some of the plurality of commands defined by the media player accessory protocol,
    wherein during the authentication operation, one of the plurality of application commands is one of the commands in the command set supported by the accessory.

8. The media player of claim 1 wherein the processor is further configured to:
    receive a device identification message from the accessory, the device identification message including an indication of a command set supported by the accessory, the command set including at least some of the plurality of commands defined by the media player accessory protocol, wherein the command set includes a first command that relates to a risky behavior and a second command that relates to a non risky behavior,
    wherein if the second command is received prior to validation of the second authentication information, the media player invokes a corresponding media player application function but if the first command is received prior to validation of the second authentication information, the media player ignores the first command.

9. The media player of claim 1 wherein in the event that an error occurs during the authentication operation, the processor is configured to retry the authentication operation if a timeout period has not ended.

10. The media player of claim 9 wherein the processor is further configured to update a count of retries and wherein the authentication operation fails in the event that the count of retries exceeds a retry limit.

11. The media player of claim 1 wherein if the authentication operation fails, the processor is configured to provide a notification to a user of the media player, and wherein the notification includes a message displayed on a display screen of the media player.

12. A media player comprising:
    a processor; and
    an accessory interface coupled to the processor and configured to communicate with an accessory according to a media player accessory protocol that defines a plurality of application commands to invoke a plurality of media player application functions, the plurality of media player application functions including a first function associated with a risky behavior and a second function associated with a non-risky behavior, wherein the processor is configured to:
receive first authentication information from the accessory in response to an authentication request, the first authentication information being usable by the media player in the authentication operation;
receive at least one of the plurality of application commands from the accessory prior to completion of the authentication operation based on validation of the first authentication information;
in response to the at least one application command, invoke an associated one of the plurality of media player application functions if the associated one of the plurality of media player application functions is the second function but not invoke the associated one of the plurality of media player application functions if the associated one of the plurality of media player application functions is the first function; and
receive an authentication signature from the accessory for validation, wherein the authentication operation completes upon validation of the authentication signature, the authentication signature being different from the first authentication information.

13. The media player of claim 12 wherein if the authentication operation fails, the processor is configured to ignore any subsequent commands received from the accessory.

14. The media player of claim 12 wherein the plurality of media player application functions include a function associated with processing at least one of: voice data, video data, or other data.

15. The media player of claim 12 wherein the first function is a function related to downloading executable media onto the media player.

16. The media player of claim 12 wherein the first function is a function related to performing a firmware update on the media player.

17. An accessory comprising:
a controller; and
a media player interface coupled to the controller and configured to communicate with a media player according to a media player accessory protocol that defines a plurality of application commands to invoke a plurality of media player application functions, wherein the controller is configured to:
receive an authentication request from the media player, the authentication request initiating an authentication operation;
transmit first authentication information to the media player in response to the authentication request,
send at least one of the plurality of application commands to the media player based on validation of the first authentication information and prior to completion of the authentication operation, wherein the media player processes the at least one application command, thereby allowing the accessory to invoke at least one of the plurality of media player application functions during the authentication operation; and
transmit second authentication information different from the first authentication information to the media player for validation, wherein the authentication operation completes upon validation of the second authentication information, and wherein if the authentication operation fails, any subsequent application commands sent by the accessory are not processed by the media player.

18. The accessory of claim 17 wherein the application commands defined by the media player accessory protocol includes commands to transfer and store information between the media player and the accessory.

19. The accessory of claim 17 wherein the application commands defined by the media player accessory protocol includes a command associated with processing of at least one of voice, video, or other data between the media player and the accessory.

20. An accessory comprising:
a controller; and
a media player interface coupled to the controller and configured to communicate with a media player according to a media player accessory protocol that defines a plurality of application commands to invoke a plurality of media player application functions, the plurality of media player application functions including a first function associated with a risky behavior and a second function associated with a non-risky behavior, wherein the controller is configured to:
receive an authentication request from the media player, the authentication request initiating an authentication operation;
send first authentication information to the media player in response to the authentication request, the first authentication information being usable by the media player in the authentication operation;
send at least one of the plurality of application commands to the media player prior to completion of the authentication operation based on validation of the first authentication information, wherein in response to the at least one application command, the media player invokes an associated one of the plurality of media player application functions if the associated one of the plurality of media player application functions is the second function but does not invoke the associated one of the plurality of media player application functions if the associated one of the plurality of media player application functions is the first function;
send an authentication signature to the media player for validation, wherein the authentication operation completes upon validation of the authentication signature, the authentication signature being different from the first authentication information; and
wherein if the authentication operation fails, any subsequent commands sent by the accessory are ignored by the media player.

21. The accessory of claim 20 wherein the plurality of media player application functions include a function to transfer and store information between the media player and the accessory.

22. The accessory of claim 20 wherein the first function is a function related to downloading executable media onto the media player.

23. The accessory of claim 20 wherein the first function is a function related to performing a firmware update on the media player.

24. The accessory of claim 20 wherein the media player application functions include functions associated with the processing of voice, video, and other data between the media player and the accessory.

25. The accessory of claim 20 wherein after completion of the authentication operation, the controller is configured to send a subsequent application command to invoke the first function, wherein if the authentication operation completed successfully, the media player invokes the first function in response to the subsequent application command.

* * * * *